July 29, 1952  R. K. SCHELKE  2,605,314
ELECTRICAL CABLE WITH INTERMEDIATE DISCONNECT MEANS
Filed June 11, 1948
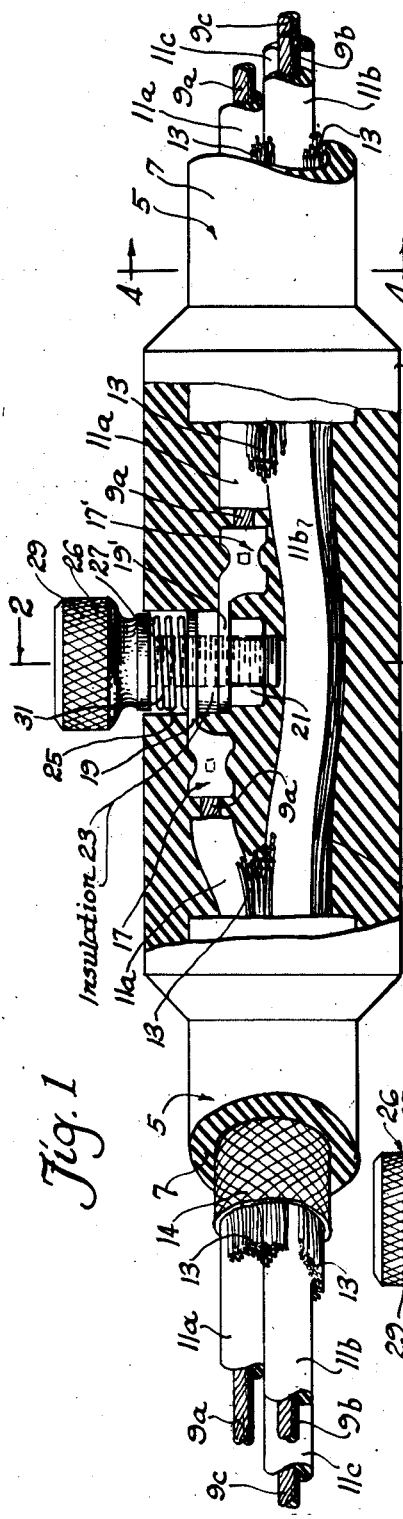
INVENTOR.
Robert K. Schelke
BY
Soans, Pond, & Anderson
Attorneys Patented July 29, 1952

2,605,314

UNITED STATES PATENT OFFICE 2,605,314

ELECTRICAL CABLE WITH INTERMEDIATE DISCONNECT MEANS

Robert K. Schelke, Richmond, Ind., assignor to Belden Manufacturing Company, Chicago, Ill., a corporation of Illinois Application June 11, 1948, Serial No. 32,451

6 Claims. (Cl. 173—324)

The present invention relates generally to multi-conductor electrical cables and in particular to a disconnecting or open-circuiting device which is adapted to form an integral portion of such cables.

In servicing and testing electrical equipment such as calculating machines, bookkeeping machines, electronic apparatus, and the like, it is often necessary to disconnect one or more of the conductors contained in a multi-conductor supply or interconnecting cable for the period of the test while maintaining the electrical continuity of the remaining conductors. The obtaining of this open circuit with conventional multi-conductor cables usually requires the removal of one or more of the conductors from the associated connector plug or socket for the period of the test, and after the test is completed the conductor must be restored to its original condition. These are often time consuming operations because of the difficulty of locating the proper conductor in the cable and the tedious procedure involved in properly dismantling and reassembling the connector plug. Moreover, after the serviceman or operator has finished the test, he sometimes fails to replace the open circuited conductor in the proper manner with the result that the operation of the equipment may be erratic.

Accordingly, the principal object of the present invention is the provision of an open-circuiting or disconnect device for multiple conductor electrical cables which shall constitute an integral part of the cable, which shall be positive in action, and which shall be simple and inexpensive to manufacture. A further object of the invention is the provision of a device of the class described which shall include visual means for indicating whether the proper cable is open circuited or is in current carrying condition. Other objects and advantages of the invention will be made clear by the following description and the accompanying drawings.

In the drawings:

Fig. 1 is a fragmentary, elevational view, partially in section, showing an electrical cable which is provided with an open circuit or disconnect device in accordance with the invention;

Fig. 2 is a sectional view taken on line 2—2 in Fig. 1;

Fig. 3 is a fragmentary, elevational view, partially in section, of a modified disconnect device in accordance with the invention;

Fig. 4 is a sectional view taken on line 4—4 in Fig. 1; and

Fig. 5 is a fragmentary view, partially in section, of another modified disconnect device in accordance with the invention.

The two embodiments of the invention shown in the drawings are particularly adapted for use with a three conductor cable, and are so illustrated. It will be understood, however, that the features of the invention are applicable for use with other known types of conductor cables, without regard to the number of conductors included in such cable. The cable 5, associated with the disconnect device illustrated in Fig. 1, has an outer covering of insulating material 7 which encloses three, individually insulated, metallic conductors 9a, 9b, and 9c respectively; the individual insulating jackets are indicated as 11a, 11b, and 11c in the drawings. The usual fibrous filler or cords 13 occupy the space between the insulated conductors, and the entire assemblage of the filler cords 13 and the conductors is enclosed within a braid 14 onto which the insulating covering 7 is extruded or otherwise formed (Figs. 1 and 4). The filler cords 13 increase the strength and flexibility of the cable.

The disconnect construction of this embodiment of the invention is enclosed within a body 15 of resilient plastic or other rubber-like compound which is molded about the cable 5 intermediate its ends, the body 15 insulating the various conductors one from the other and maintaining the various members in their predetermined positions. Before the disconnect body 15 is molded to the cable 5, the outer insulating covering 7 of the cable 5 is stripped back to expose the fibrous filler cords 13 and the individual insulated conductors 9. Desirably, the fibrous filler cords 13 are not cut when the insulating covering 7 is stripped back. In the devices illustrated the filler cords extend unbroken through the region of the device, however for the purpose of clarity one of the cords 13 is broken away to show various features of the invention. After the outer insulating covering of the cable has been removed in the desired region, the conductor which is to be open-circuited during test is cut, and its associated insulating jacket is stripped away from each end section of the metallic conductor. A conventional contact lug or terminal member 17 is then crimped or soldered onto each of the free ends of the disunited conductor.

In the illustrated structure, each of the terminal members 17 and 17' includes a flattened contact portion 19 and 19' respectively having an opening or aperture 20 therein for attachment to a binding post or the like. In order that the terminals may be mechanically and electrically connected together by a metallic connection, one of them, 17', is provided with a threaded fastening means. In the illustrated structure the threaded fastening means constitutes a nut 21 which is soldered or otherwise attached to the contact portion 19' of the terminal 17', the passageway through the nut being arranged to align with the opening through the portion 19. If a terminal of relatively heavy construction is used, the aperture 20 in the flat terminal portion may itself be threaded.

When assembling the device for the molding operation the two terminals 17 and 17' are spaced apart by means of an insulating washer 23, the terminal 17', to which is attached the nut 21, being placed closely adjacent the continuous conductors as illustrated particularly in Fig. 2. The openings or apertures 20 in the terminals 17 and 17' and the opening in the insulating washer 23 are aligned with one another and a suitable threaded molding arbor (not shown) is screwed into the nut 21 to tightly engage the three elements together in superposed layers. The entire assemblage is positioned within a suitable mold, a mass of rubber or other resilient insulating material is placed in the mold, and in accordance with normal procedure, heat and pressure are applied to integrally mold the insulating material to the insulating covering 7 of the cable. After the molding operation is completed, the arbor is removed leaving a radially extending passageway 25 in the insulating body 15; this passageway provides access to the terminal portions 19 and 19', as will be hereinafter described. The terminals 17 and 17' may be insulated one from the other by the insulating body 15. This can be accomplished by providing a keyway or the like in the apertures 20 and by fabricating the molding arbor with a key which is adapted to engage the keyways in the apertures 20. The key and keyways should be proportioned in a manner such that upon turning the arbor relative to the terminals 17 and 17', the key will hold the terminals spaced apart. The insulating body 15 can then be molded in place, and, after the molding operation, the arbor can be removed before the resilient insulating body has completely hardened, the terminals 17 and 17' then being held spaced apart and insulated by the resilient insulating body.

The disconnect device illustrated in Fig. 1 is particularly useful for opening and closing the ground circuit in a three wire cable. When the electrical connection is to be made between the two terminal portions 17 and 17', a connecting or contact member 26 having a threaded shank 27 and a knurled knob or head 29 is passed through the passageway 25 to engage the nut 21. To facilitate easy removal of the connecting member 26, a helical spring 31 is interposed between the upper terminal portion 19 and the knurled head 29. The spring also assures the obtaining of a reliable, low resistance electrical contact between the terminal portions 19 and 19' when the connecting member 26 is screwed in place. In the event that the construction is to be used on an energized conductor, the knurled knob 29 should be made from plastic or other suitable non-conducting material.

The construction illustrated in Fig. 3 is particularly useful when it is desirable to connect and disconnect two of the conductors in a cable 7, the cable 7 and its components being designated with the same reference numerals used in Figs. 1 and 4. The particular disconnect device illustrated at 33 includes two disconnecting units, indicated at 35 and 37, each of which is connected into a separate conductor; for the purpose of illustration, the units are made in different manners. In certain respects disconnecting unit 35 is generally similar to the disconnect device illustrated in Figs. 1 and 2, and the elements which are identical carry the same designating numerals as in Figs. 1 and 2, except that they are provided with a suffix "a." However, in disconnect unit 35 the knurled knob 29a and the shank 27a are made of different materials, the knob 29a being fabricated from an insulating plastic and the shank 27a being fabricated from a conducting material. The spring 31 is omitted in this construction and the electrical connection is made by a contact or collar 39 which is carried by the shank 27a and which is adapted to contact the terminal portion 19a.

The second disconnect unit 37, which forms a part of the disconnect device 33, is also generally similar to the Fig. 1 construction, and the various elements which are identical to those described are designated by the same numeral with the added suffix "b." The main difference between the unit 37 and the unit 33 is that in unit 37 the connecting member 41 comprises a round-headed machine screw 41 or the like. This arrangement has the advantage that the head of the connecting member 41 can be positioned below the surface of the resilient body 15a, and a suitable plastic or rubber-like plug 43 can then be inserted in the passageway 25 to protectively close the outer portion of the resilient body. The two disconnect units 35 and 37 may be located side by side, as illustrated, or they may be angularly disposed relative to one another. The angular disposition of the devices will be found particularly useful when a multiplicity of disconnects are to be provided.

It is apparent that each of the conductors within the cable can be provided with a disconnect device in accordance with the invention, and in the event that provision is made for disconnecting one or more energized conductors it is desirable to fabricate the protecting plugs 43 or the knurled heads 29 from various colored materials. In the alternative, the knurled heads can be fabricated in distinctive shapes or the cross sectional shape of the passageways can be varied to indicate the proper connections to the service man.

In certain instances it may be desirable to employ a disconnect device for effecting a multiple, molded splice. A three-way splice construction embodying various features of the invention is illustrated in Fig. 5 of the drawings. In the illustrated structure a three conductor cable 45 is spliced to a two conductor cable 47, one of the conductors of the two conductor cable being connected to one of the conductors of the three conductor cable and the other of the conductors of the two conductor cable being connected by the disconnect device 49 to two of the conductors of the three conductor cable.

The disconnect device 49 includes terminals 51a, 51b, and 51c, one of which is attached to each of the conductors to be interconnected. A threaded fastening means 53 is attached to the terminal 51a, and an insulating washer 55 is adapted to insulate terminal 51a from terminal 51b. A spring-type lock washer 57 is positioned on the terminal 51b, the lock washer 57 being proportioned to engage a contact means, the shoulder 59 of a shoulder screw 61. The terminal 51c, which is provided with an aperture of sufficient size to admit the shoulder 59 of the shoulder screw 61, is positioned above the lock washer 57 and is insulated therefrom by an insulating washer 63. The head of the shoulder screw 61 engages the terminal 51c to a spring-type lock washer 65 to complete the assemblage. The entire assemblage is then enclosed within a body of resilient insulating material 67. The shoulder screw 61, the contact member, may be moved into and out of the body of resilient insulating material to effect the interconnection and disconnection of the three terminals and their associated conductors.

The novel disconnect or open-circuiting device described in the foregoing is simple to construct and economical to manufacture, and is substantially unbreakable in use. The device in its preferred form includes a resilient body of insulating material which is molded onto the insulating covering of the cable, in a manner such that each of the elements of the device is anchored within the body and is protectively surrounded at all times. The fibrous filler cords, which maintain the flexibility and strength of the associated cable, extend unbroken through the insulating body, thereby greatly increasing the strength and durability of the device. As has been pointed out above, positive identification of the various conductors in the insulating body can be accomplished by either color coding or shape coding the connecting means; this speeds and simplifies testing and servicing operations. Various features of the invention which are believed to be new are set forth in the appended claims.

I claim:

1. In electrical apparatus, an electrical cable comprising an outer covering of resilient insulating material within which are disposed a plurality of individually insulated conductors and a fibrous filler or cord, a body of resilient insulating material integrally molded about a portion of said cable intermediate its ends, at least one of the conductors of said cable being disunited in the region of the said cable which is within said body of resilient material, said other conductors and said fibrous filler being continuous, a terminal member attached to each of the ends of said disunited conductor, said terminal members overlying one another and being held in spaced-apart relation by said body of resilient insulating material, and a unitary contact member movable into and out of said resilient body to electrically connect and disconnect said terminal members.

2. In electrical apparatus of the class described, an electrical cable which includes an outer covering of resilient insulating material having a plurality of conductors disposed therein, a body of resilient insulating material disposed about, and integrally molded to, a portion of said cable intermediate its ends, at least one of the plurality of conductors of said cable being disunited in the region of said cable within said body of resilient insulating material, a terminal member attached to each of the ends of said disunited conductor within said body of insulating material, said terminal members being held in superposed spaced-apart relation by said body of insulating material, an aperture in each of said terminal members, a passageway in said body of insulating material connecting the apertures of each of said terminal members and communicating with the surface of said body of insulating material, and a contact member movable into and out of said passageway to electrically and mechanically connect and disconnect said terminal members.

3. In combination in electrical apparatus, an electrical cable comprising an outer covering of resilient insulating material within which are disposed a plurality of individual conductors, a body of resilient insulating material disposed about and integrally molded to a portion of said cable intermediate the ends thereof, at least one of the conductors of said cable being disunited in the region of said cable which is within said body of resilient material, a terminal member attached to each of the ends of said disunited conductor, supplemental insulating material intermediate said terminal members, said terminal members being held in superposed spaced-apart relation by said supplemental insulating material and being engageably held in position relative to one another by said body of insulating material, said terminal members being spaced a distance substantially less than the thickness of said body, apertures in said supplemental insulating material and in each of said terminal members, said apertures being aligned in relation with one another, a passageway in said body of insulating material communicating with said apertures and with the surface of said body, and a contact member movable into and out of said passageway to electrically connect and disconnect said terminal members.

4. In combination in electrical apparatus, an electrical cable comprising an outer covering of resilient insulating material having a plurality of conductors disposed therein, a body of resilient insulating material disposed about and integrally molded to a portion of said cable intermediate the ends thereof, at least one of the plurality of conductors of said cable being disunited in the region of said cable which is within said body of said resilient material, a terminal member attached to each of the ends of said disunited conductor, said terminal members being held in superposed spaced-apart relation by portions of said body of insulating material, apertures in each of said terminal members, said apertures being aligned in relation with one another, a passageway in said body of insulating material communicating with said apertures and with the surface of said body, a unitary contact member movable into and out of said passageway to engage and disengage, and electrically and mechanically connect and disconnect said terminal members, said contact member and said body of resilient insulating material being proportioned so that said contact member is disposed entirely within the passageway, and a plug member for closing the outer end of said passageway whereby said terminal members and said contact member are protectively enclosed.

5. In combination in electrical apparatus, a first electrical cable including at least one conductor, a second electrical cable including a plurality of conductors, and means for splicing at least one of said conductors of said first cable to a plurality of said conductors of said second cable in a manner such that said spliced together conductors may be electrically connected and disconnected at will, said splicing means including a body of resilient insulating material integrally attached about the adjacent end portions of each of said cables, a terminal member attached to each of the ends of the conductors of said first and second cables within said body of insulating material, said terminal members being held in superposed spaced apart relation by a portion of said body of resilient material so as to be electrically insulated from one another, an aperture in each of said terminal members, a passageway in said body of insulating material connecting the apertures of each of said terminal members and communicating with the surface of said body of insulating material, and a connecting member movable into and out of said passageway to engage and disengage, and electrically connect and disconnect the ends of said conductors of said first and second cables which are to be spliced.

6. In combination with electrical apparatus, an electrical cable comprising an outer covering of resilient insulating material within which is disposed a plurality of individual conductors, a body of resilient insulating material disposed about and integrally molded to a portion of said cable intermediate the ends thereof, at least one of the conductors of said cable being disunited in the region of said cable which is within the body of said resilient material, a terminal member attached to each of the ends of the said disunited member, said terminal members being in overlying relation, intermediate said terminal members, said terminal members being held in spaced-apart relation by said supplemental insulating member, said terminal members and said supplemental insulating member being held in position by said body of resilient insulating material, apertures in said supplemental insulating material and in each of said terminal members, said apertures being aligned with relation to one another, a passageway in said body of insulating material communicating with said apertures and with the surface of said body, a contact member movable into and out of said passageway to engage and disengage, and to electrically connect and disconnect said terminal members, said contact member including an enlarged head portion and a shank which is adapted to be mechanically fastened to one of said terminal members, and a spring which is disposed intermediate the other of said terminal members and the head portion of said contact member.

ROBERT K. SCHELKE.

REFERENCES CITED

The following references are of record in the file of this patent:

UNITED STATES PATENTS

| Number | Name | Date |
|---|---|---|
| 895,977 | Dawber | Aug. 11, 1908 |
| 913,809 | Carr | Mar. 2, 1909 |
| 1,946,889 | Wessel | Feb. 13, 1934 |
| 2,253,830 | Winterhalter | Aug. 26, 1941 |
| 2,437,358 | Mowery | Mar. 9, 1948 |
| 2,475,184 | Hudson | July 5, 1949 |

FOREIGN PATENTS

| Number | Country | Date |
|---|---|---|
| 386,135 | Germany | Dec. 14, 1923 |
| 475,945 | Great Britain | Nov. 29, 1937 |
| 484,541 | Great Britain | May 6, 1938 |